United States Patent Office 2,819,398
Patented Jan. 7, 1958

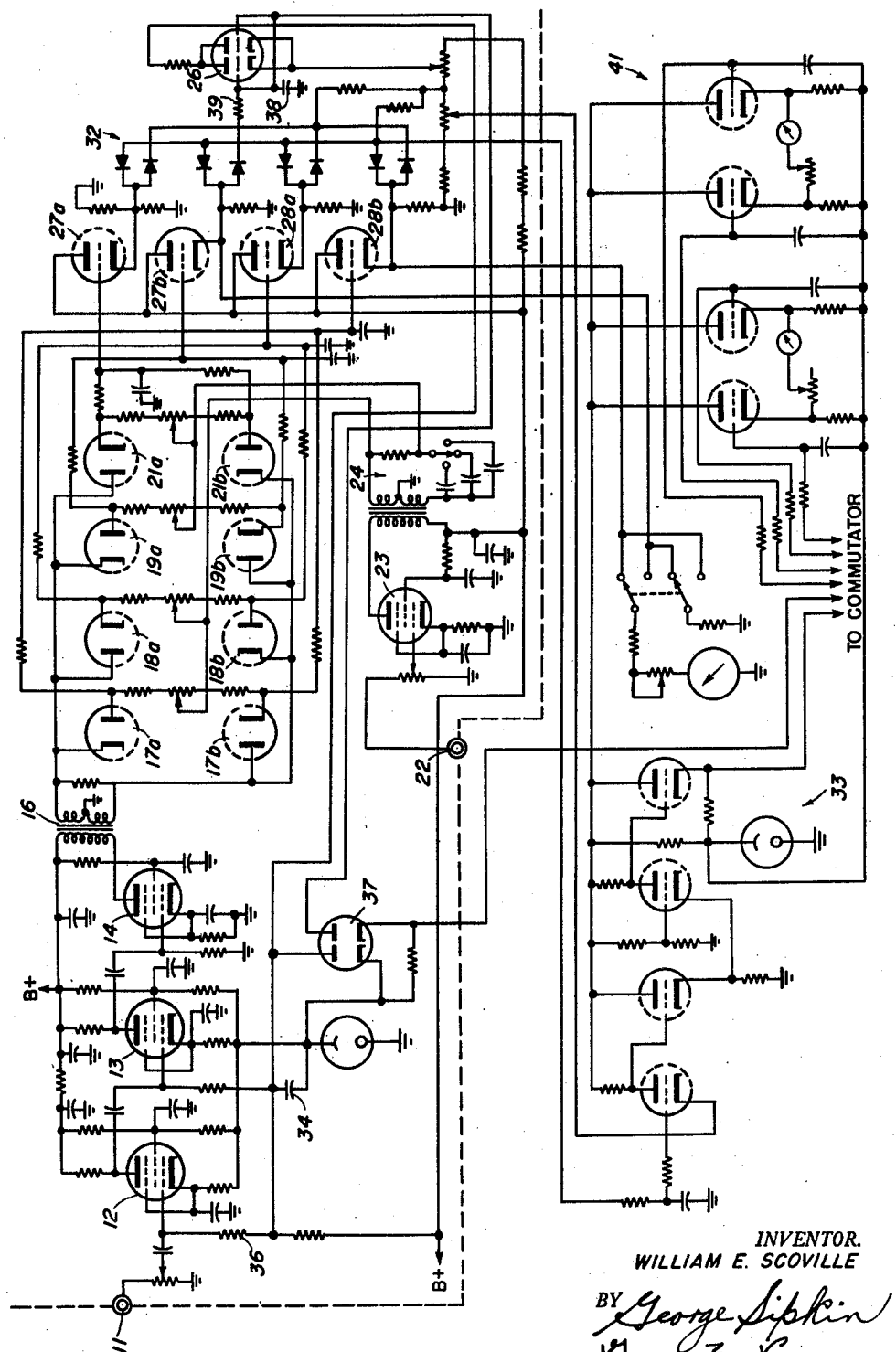

2,819,398
COMMUTATOR SYNCHRONIZER

William E. Scoville, Albuquerque, N. Mex.

Application August 3, 1955, Serial No. 526,337

8 Claims. (Cl. 250—27)

(Granted under Title 35, U. S. Code (1952), sec. 266)

The invention described herein may be manufactured and used by or for the Government of the United States of America for governmental purposes without the payment of any royalties thereon or therefor.

This invention relates to an improved method and apparatus for obtaining commutator synchronization information, from transmissions with a poor signal to noise ratio, which is then fed to suitable apparatus for determining the synchronization of a local transmitter keying with the keying of a master transmitter on a common frequency. In a system used for commutator synchronization, it is necessary to develop a D.-C. pulse every time the remote signal is received. This D.-C. pulse is fed into sampling contacts on a commutator which keys the local transmitter. When these D.-C. pulses are not in the proper relationship in time, an error voltage is developed which can be read on a meter and corrections can then be made. It is necessary that the D.-C. pulse be as free of noise as possible and to be an accurate indication of "signal on" time.

The old method of developing the D.-C. pulse was to use the D.-C. obtained by rectification of the received carrier or to filter and rectify the demodulated carrier from the receiver. However, these old methods did not work sufficiently well in the presence of high noise levels so as to check the synchronization accurately.

The apparatus of this invention supplies a D.-C. pulse which is an accurate replica of the "signal on" time. In the present method, the radio frequency phase detector is used to produce the D.-C. pulse with the best possible signal to noise ratio. This pulse is then fed to a clipper amplifier which applies it to the commutator contacts, which in turn control the transmission time of the local transmitter. The purpose of the phase detector circuit is to produce a negative D.-C. voltage output which is then fed to the clipper amplifier circuit from which it in turn goes to commutator segments and then to the integration circuits. This consists of four integration circuits and essentially two vacuum tube volt meters which will give indications on the meters of zero on one meter and a positive indication on the other meter when the two transmitters are in synchronization.

It is therefore an object of this invention to provide an improved method and apparatus for obtaining commutator synchronization information.

A further object is the provision of a method and apparatus for obtaining synchronization information for keying a local transmitter with a master transmitter on a common frequency.

A further object is the provision of apparatus for receiving a remote transmitted signal and for supplying in response thereto a D.-C. pulse with a high signal to noise ratio for comparison in time with a local transmitter keyed signal.

Other objects and many of the attendant advantages of this invention will be readily appreciated as the same becomes better understood by reference to the following detailed description when considered in connection with the accompanying drawing which represents a schematic diagram of the phase detecting circuit, clipper amplifier circuit and integration circuit showing connections to the commutator (not shown).

A remote signal is received at remote signal input 11 where it is passed through the remote amplifiers 12, 13, and 14 to transformer 16. From the transformer it then passes to the four phase detectors 17, 18, 19, 21, which are provided in 90° phase relationship. These detectors are necessary since the arriving signal might be of any phase. In order for the detectors to operate, a reference signal of the same frequency as the remote signal is fed into input 22, amplified at 23, passed through phase shifting network 24 which produces two signals of 90° shift. These signals are applied to the appropriate phase detectors to produce the four outputs which are 90° phase relationship. These detectors, together with the automatic gain control 26 are for the purpose of providing an output of constant polarity and amplitude.

As shown in the drawing, detectors 17, 18, 19, and 21 are dual diodes having four D.-C. outputs connected to the grids of cathode followers 27a, 27b, 28a, and 28b which are used to avoid loading of the phase detectors. The outputs of the cathode followers are applied to two sets of four germanium diodes arranged as gates as shown in the drawing. One set of diodes selects the most positive going cathode of the cathode followers and applies the signal to the automatic volume control (AVC) tube 26 grid. The other set of four selects the most negative going cathode and applies the signal to the input of the amplifier circuit 33. The AVC tube 26 is fed back to the grids of the signal amplifiers 12, 13 preceding the phase detectors through an appropriate time constant provided by capacitor 34 and resistor 36.

Both local and remote signals come into the remote signal input 11 on a time sharing basis. It is desired to hold the remote signal amplifier gain such that the required voltage can be fed to the phase detector circuit from the remote signal. However, to do this when the local signal is on, it would increase the AVC voltage and when it is time for the remote signal to come back on, the AVC voltage would be too great, obscuring the effect of the remote signal. This is corrected by tube 37. The plate of the right side of dual diode 37 is connected to the grid of the AVC and the cathode to the long contact on the commutator which keys the local transmitter. By selecting the proper commutator segment which also keys the local transmitter and by using a long contact on the transmitter, the cathode of the tube on the right side can be grounded just before the local transmitter comes on to the air, grounding the grids of the AVC tube. In this manner when the local transmitter is on, tube 37 clamps the AVC to ground so that no AVC information is fed to amplifiers 12 and 13. This does not affect the output of the cathode followers but it does change the AVC voltage which is sent back to the other half of tube 37. A short time after the local transmitter goes off, the grid of the AVC tube 26 is ungrounded and once again permits a remote signal to produce AVC information which is applied to amplifiers 12 and 13.

The other half of control tube 37 serves as a clamp tube to prevent the grids of tubes 12, 13 from going positive in the absence of signal. Since AVC tube 26 is controlled through a time constant determined by capacitor 38 and resistor 39 in the D.-C. output of the phase detector, it is not actuated by noise and only operates when a signal coherent with the local reference is received.

The negative D.-C. pulse from the cathode followers 27a, 27b, 28a, 28b is suitably amplified by clipper amplifier circuit 33 before passing to the commutator segments (not shown). The commutator is the same one that is keying the local transmitter. If this D.-C. pulse is not fed to the commutator in proper timing relationship error voltages will occur in integration circuit 41 and give meter indications which indicate improper synchronization. The commutator phase is then adjusted until the proper meter indications are obtained, which in turn indicates the proper synchronization.

Obviously many modifications and variations of the present invention are possible in the light of the above teachings. It is therefore to be understood that within the scope of the appended claims the invention may be practiced otherwise than as specifically described.

What is claimed is:

1. In apparatus for obtaining a direct current pulse from an intermittent remote signal having a low signal to noise ratio for use with means for synchronizing local transmitter keying with the keying of a master transmitter on a common frequency, means for respectively receiving and amplifying a reference signal and said remote signal, said receiving and amplifying means individual to said remote signal also receiving a local signal from the local transmitter on a time sharing basis with said remote signal, means responsive to said amplified signals for providing an output of constant polarity and amplitude comprising phase detecting circuits and an automatic volume control, and means controlled by the synchronization means for disabling the automatic volume control when said local transmitter is transmitting a signal on a time-sharing basis with said master transmitter.

2. Apparatus as defined in claim 1 wherein said receiving and amplifying means for said remote and local signals includes amplifier means having grids for receiving control potential from said automatic volume control, and means for preventing the grids of said amplifier means from going positive in the absence of said remote signal.

3. Apparatus as defined in claim 1, and means operative concurrently with said disabling means for preventing application of positive potential to the input of said amplifier means individual to said remote signal.

4. In apparatus for obtaining a direct current pulse from an intermittent remote signal having a low signal to noise ratio for use in synchronizing local transmitter keying with the keying of a master transmitter on a common frequency, balanced radio frequency phase detection means responsive to a remote signal and reference signal of the same requency therewith for generating a direct current pulse as a replica of the remote signal on-time and with a high signal to noise ratio, said detection means comprising four detectors in 90° phase spaced relationship, means including a diode network electrically connected to said detectors and including two sets of diodes responsive respectively to the most positive going signal and the most negative going signal received from said detectors for providing two direct current signals of constant amplitude and polarity, one of said signals providing said direct current pulse, and an automatic volume control circuit responsive to the other of said signals for maintaining constant amplitude input of said remote signal to said detection means.

5. In apparatus for obtaining a direct current pulse from an intermittent remote signal having a low signal to noise ratio for use in synchronizing local transmitter keying with the keying of a master transmitter on a common frequency, phase detector means including a plurality of detectors responsive to remote and reference signals of same frequency and unknown phase relationship, a diode network responsive to said detector means for summing the individual outputs of said plurality of detectors to provide a direct current signal of constant amplitude and polarity regardless of phase relationship between the remote and reference signals, said diode network comprising a plurality of diodes individual to said detectors and having like electrodes thereof respectively connected to said detectors and the other like electrodes thereof connected together to provide an output terminal for said direct current signal.

6. Automatic volume control means for controlling and maintaining at constant amplitude the amplitude of the output of a phase detection system responsive to remote and reference signals of the same frequency, means responsive to the output of said volume control means for receiving and applying said remote signal and a local signal to said phase detection system in time sharing relation, and means controlled by the keying means of a local transmitter applying said local signal to said signal receiving means for disabling said automatic volume control means when said local transmitter is operating at the same frequency of said remote signal.

7. Radio frequency phase detector means comprising a plurality of detectors responsive to remote and reference signals for producing a plurality of outputs of different amplitudes depending upon the phase difference between said signals, cathode follower circuit means comprising a plurality of cathode follower circuits responsive to said outputs respectively for preventing loading of said detector means, a diode network comprising a plurality of diodes having like electrodes respectively connected to the outputs of said cathode follower circuits and having other like electrodes thereof connected together thereby to provide a direct current signal of constant polarity and amplitude as a replica of said remote signal on-time.

8. In apparatus for obtaining a direct current pulse from an intermittent remote signal having a low signal to noise ratio for use in synchronizing local transmitter keying with the keying of a master transmitter on a common frequency, an amplifier for remote signals, radio frequency phase detector means connected across the output of the amplifier means, said detector means comprising four detectors, each detector comprising a pair of diodes connected in back to back relation across the output of said amplifier means, balanced output means across each of said detectors whereby the output is zero for the remote signal, thereby to cancel noise incident to the remote signal, two of said detectors being 180° out of phase with respect to the other two, amplifier means for reference signals of the same frequency as said remote signals, means shifting the phase of the resulting amplified reference signals by 90°, circuit means for injecting said reference signals with zero phase shift into the outputs of said two of said detectors and for injecting the reference signal of 90° phase shift into the other two of said detectors, whereby said detectors each yield direct current output signals regardless of the phase difference between the remote and reference signals, and means responsive to said detector outputs for providing a direct current signal of constant polarity and amplitude regardless of the phase relationship between said signals.

References Cited in the file of this patent

UNITED STATES PATENTS

| | | |
|---|---|---|
| 2,559,038 | Bass | July 3, 1951 |
| 2,703,380 | Fraser | Mar. 1, 1955 |
| 2,718,546 | Schlesinger | Sept. 20, 1955 |